United States Patent
Griffin et al.

(10) Patent No.: US 6,278,442 B1
(45) Date of Patent: Aug. 21, 2001

(54) HAND-HELD ELECTRONIC DEVICE WITH A KEYBOARD OPTIMIZED FOR USE WITH THE THUMBS

(75) Inventors: Jason T. Griffin; John A. Holmes; Mihal Lazaridis; Herb A. Little; Harry R. Major, all of Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 09/106,585

(22) Filed: Jun. 29, 1998

Related U.S. Application Data

(63) Continuation-in-part of application No. 29/089,942, filed on Jun. 26, 1998.

(51) Int. Cl.[7] .................................................. G09G 5/00
(52) U.S. Cl. .......................... 345/169; 345/168; 400/489
(58) Field of Search .................................... 345/168, 169, 345/172, 158, 170, 171, 156, 146, 160, 902; 341/23, 22, 21, 20; 400/472, 486, 489, 479

(56) References Cited

U.S. PATENT DOCUMENTS

| | | | |
|---|---|---|---|
| D. 383,756 | * 9/1997 | Henderson et al. | D14/191 |
| D. 386,497 | * 11/1997 | Huslig et al. | D14/191 |
| 5,367,298 | * 11/1994 | Axthelm | 341/22 |
| 5,920,308 | * 7/1999 | Kim | 345/169 |
| 5,974,238 | * 10/1999 | Chase, Jr. | 395/200.78 |
| 5,982,520 | * 11/1999 | Weiser et al. | 359/172 |
| 6,023,779 | * 9/1997 | Fullam et al. | 714/751 |
| 6,047,047 | * 4/2000 | Aldridge et al. | 379/93.24 |

* cited by examiner

*Primary Examiner*—Bipin Shalwala
*Assistant Examiner*—Mansour M. Said
(74) *Attorney, Agent, or Firm*—Jones, Day, Reavis & Pogue; Charles B. Meyer; Krishna K. Pathiyal

(57) ABSTRACT

A hand-held electronic device with a keyboard optimized for use with the thumbs is disclosed. In order to operate within the limited space available on a hand-held electronic device, the present invention optimizes the placement and shape of the keys, preferably using keys that are oval or oblong in shape, and that are placed at angles designed to facilitate thumb-typing. The angles at which keys on either side of the keyboard are placed is complimentary.

48 Claims, 4 Drawing Sheets

HAND-HELD ELECTRONIC DEVICE WITH A KEYBOARD OPTIMIZED FOR USE WITH THE THUMBS

This is a continuation in part of U.S. Design Application Ser. No. 29/089,942 entitled Hand-held Messaging Device with Keyboard, filed Jun. 26, 1998, and assigned to the assignee of the present invention.

BACKGROUND OF THE INVENTION

The present invention is directed toward the field of small, hand-held electronic devices such as personal data assistants (PDA's), personal information managers (PIM's), two-way pagers and the like. In particular, the system and method of the present invention provide the user of the hand-held device with the ability to input data with a minimal amount of key strokes and optimized for use substantially with the thumbs.

In a two-way paging system that provides two-way, full text messaging, there is a need to permit the user to initiate messages and to respond to messages in a timely fashion and with text entirely created by the user. In order to keep the form factor of the two-way pager small enough to be worn on the body of the user, such as with a belt clip, the input device needs to be small, have a minimal number of keys and optimized for use with a minimal number of key strokes. Prior art systems have attempted to address these needs by incorporating virtual keyboards or pen-based input systems for user inputs to the device, but such systems require the user to input data in an unfamiliar manner. Additionally, in a small hand-held messaging device, such as a two-way pager, these systems prove awkward to use.

In order to provide a hand-held electronic device that permits a user the opportunity to enter data into an address book, a calendar, a task list, an email message or a similar text file that requires user-generated data, the instant invention is directed to an input device that is oriented to be used substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation and in a particular shape that attempts to maximize the surface area of the thumb hitting the key and to provide the user with a comfortable position of the hands for data input. Also, the orientation encourages input by the thumbs, which the inventors of the instant invention have discovered to be faster and more accurate in small hand-held electronic devices than touch-typing or "hunting and pecking" typing.

An additional feature of the invention is the use of an additional input means for control of functions that might otherwise be controlled by a keyboard that included function keys. To encourage data entry using thumbs and again to minimize the number of keys on the keyboard, the instant invention also includes a thumb-wheel for control of menus for selection of forms and functions relevant to data input. The thumb-wheel is positioned in close proximity to the keyboard to enable the easily transition from thumb-based typing to thumb control of forms and functions.

In addition to hardware features that encourage optimal data entry through the use of thumbs, there are several software features that are designed to minimize keystrokes and aid in entry of data.

The features of this invention, both individually and collectively, have not, to the knowledge of the inventors, been applied to a small hand-held electronic device that requires user-generated data entry. To permit efficient operation of such devices while keeping the form factor of the device small enough to be worn on the body, there is a general need for a hand-held electronic device that can fit in the palm of the hand and that can be operated substantially with the thumbs.

There is a further need for a keyboard for a palm-size data entry device with keys placed at an angle to optimize operation of the keyboard by the use of the thumbs.

There remains another need for a keyboard with keys that are shaped and sized to maximize contact with the thumbs while minimizing the keyboard area required for such keys.

There also remains a need for an auxiliary input device that is to be operated by the thumb for data inputs forms and function control and that, in conjunction with the keyboard, encourages and permits data entry and management through input performed substantially by the thumbs.

There remains still another need for a software-implemented user interface system that is designed, at least in part, to support and encourage data entry through use of the thumbs.

SUMMARY OF THE INVENTION

The present invention overcomes the problems noted above and satisfies the needs in this field for a hand-held electronic device with a keyboard optimized for use with the thumbs. In the preferred embodiment of the present invention, the hand-held electronic device is a two-way paging device that permits full-text, two-way messaging such as email messaging and that includes standard PDA or PIM features such as an address book, an electronic calendar, a task list and other text-based features. Such features require user input of text strings that can be lengthy and that cannot be reduced to pre-determined or "canned" strings. Thus, for such a device, the efficient entry of data in a device meant to fit into the palm of one's hand requires that two goals are achieved. First, the data entry must be relatively easy from a user perspective. This means that the user must be somewhat familiar with analogous forms of data entry and not have to be trained to use the data entry for the hand-held device. Second, the form factor does not permit a large number of keys or keys that are very large. Thus, efficient use of the keyboard space is required and functions that might be able to be performed by a standard keyboard are off-loaded to an auxiliary input device or are performed, through a minimal number of keystrokes that encourage the use of thumb-based data entry.

To accomplish these goals, the invention first optimizes the placement of the keys on the device keyboard. In order to work within the limited space available for the keyboard, it was determined that it was preferable to use keys that were oval or oblong and that were placed at angles designed to facilitate use by thumb typing. An angle for the keys on the right side of the keyboard and a complementary angle for the keys on the left side of the keyboard are chosen based upon observation of the angle at which a user will orient his or her thumbs while thumb-typing.

As shown in FIG. 2, the keys 901 on the keyboard are preferably arranged in arced rows 901. As also shown in FIG. 2, the rows of keys 901 are arced with respective radii increasing from a lower row near the bottom of the keyboard towards an upper row near the top of the keyboard. The arcs along which the keys 901 are positioned may be concentric.

The invention also minimizes the number of keys available for data input. In the preferred embodiment, only keys for the 26 letters of the English alphabet are available as well as a backspace key, a line feed key, an "alt" key, a "cap" key and a space bar. The alt key enables the user in conjunction the other keys to input numbers and symbols to perform certain functions. The placement of the keys is designed to enhance the user experience while typing with the thumbs by meeting two seemingly opposite goals—minimizing the keyboard footprint while maximizing the likelihood that proper keys will be struck by the thumb-typing user.

The invention also provides additional incentive for the user to use thumb input by providing an input device adjacent to the keyboard, but integral to the overall hand-held device. Although other devices can be used in an auxiliary fashion, the preferred device is a thumbwheel that registers movement of the wheel by measuring the number of indents traversed while rolling the wheel and that also registers as an input the depression or "clicking" of the wheel, which is performed by pressing the wheel toward the back of the pager. This clicking of the wheel is similar to the clicking of a mouse associated with a PC or any other input device that registers the depression of a button. The thumbwheel in the preferred embodiment is placed vertically on the two-way paging device so that the user can easily move his or her thumb from the thumbwheel to the keyboard and back for performing functions and retrieving data forms, such as an e-mail template or address book entry template, for data entry.

Additionally, various software techniques can be implemented to enhance the thumb-typing user's experience in using the device of the instant invention. In the preferred embodiment, for example, the user can change the capitalization of a particular letter simply by keeping a key depressed for a particular length of time without an intermittent release being detected by the keyboard controller.

The primary advantage of the present invention is that it enables efficient and userfriendly data entry into a palm-sized electronic device by maximizing the potential for user data entry through thumb typing.

These are just a few of the many advantages of the present invention, as described in more detail below. As will be appreciated, the invention is capable of other and different embodiments and its several details are capable of modifications in various respects, all without departing from the spirit of the invention. Accordingly, the drawings and description of the preferred embodiment set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE INVENTION

Figure 1:
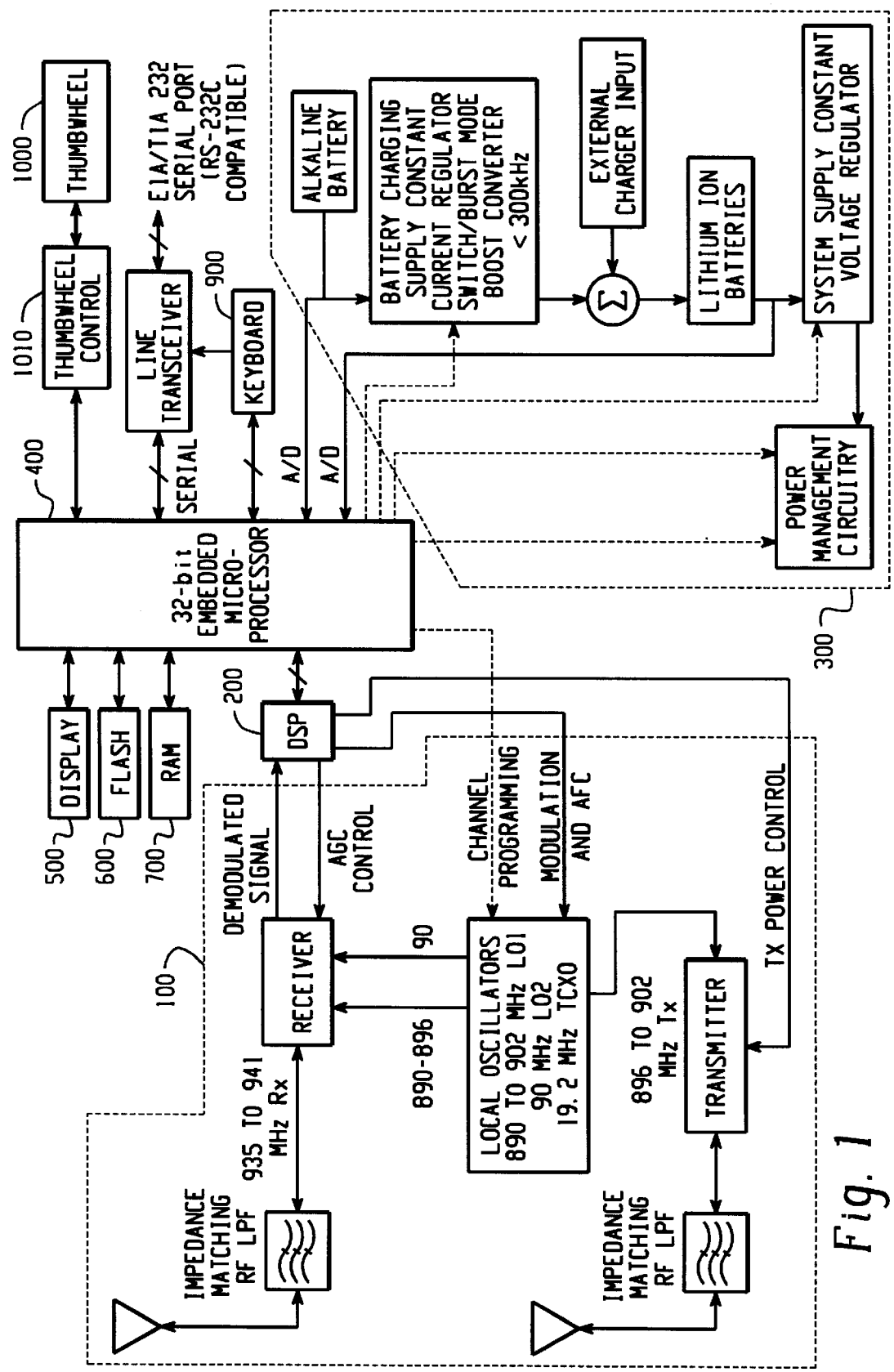
FIG. 1 is a block diagram of a two-way, full-text, messaging device incorporating a keyboard and an auxiliary data entry device.

Referring now to the drawings, FIG. 1 is a block diagram of the major subsystems and elements comprising a palm-sized, mobile, two-way messaging device that preferably incorporates the invention. In its broadest terms, the messaging device includes a transmitter/receiver subsystem 100 connected to a DSP 200 for digital signal processing of the incoming and outgoing data transmissions, power supply and management subsystem 300, which supplies and manages power to the overall messaging device components, microprocessor 400, which is preferably an X86 architecture processor, that controls the operation of the messaging device, display 500, which is preferably a full graphic LCD, FLASH memory 600, RAM 700, serial output and port 800, keyboard 900, thumbwheel 1000 and thumbwheel control logic 1010. In its intended use, a message comes via a wireless data network, such as the Mobitex network, into subsystem 100, where it is demodulated via DSP 200 and decoded and presented to microprocessor 300 for display on display 500. To access the display of the message, the user may choose from functions listed under a menu presented as a result of user interaction with thumbwheel 1000. If the message is an email message, the user may chose to respond to the email by selecting "Reply" from a menu presented on the display through interaction via thumbwheel 1000 or via menu selection from keyboard 900. In typing the reply, the user can use keyboard 900 to type full text message replies, or insert pre-determined or "canned" response by using either a particular keystroke pattern or through pulling down pre-determined text strings from a menu of items presented on display 500 through the use of thumbwheel 1000. When the reply to the message is composed, the user can initiate the sending of the message preferably by interaction through thumbwheel 1000, or alternatively, with less efficiency, through a combination of keyboard 900 keystrokes. When the microprocessor 300 receives an indication that the message is to be sent, it processes the message for transport and, by directing and communicating with transmitter/receiver subsystem 100, enables the reply message to be sent via the wireless communications data network to the intended recipient. Similar interaction through I/O devices keyboard 900 and thumbwheel 1000 can be used to initiate full-text messages or to forward messages to another party. Also, the keyboard 900 and thumbwheel 1000 can be used to permit data entry to an address book resident on the messaging device, or an electronic calendar or log book, or any other function on the messaging device requiring data entry. Preferably, the thumbwheel is a thumbwheel with a push button SPST with quadrature signal outputs, such as that manufactured by Matsushita Electronic Components Co. Ltd. as part number EVQWK2001.

Figure 2:
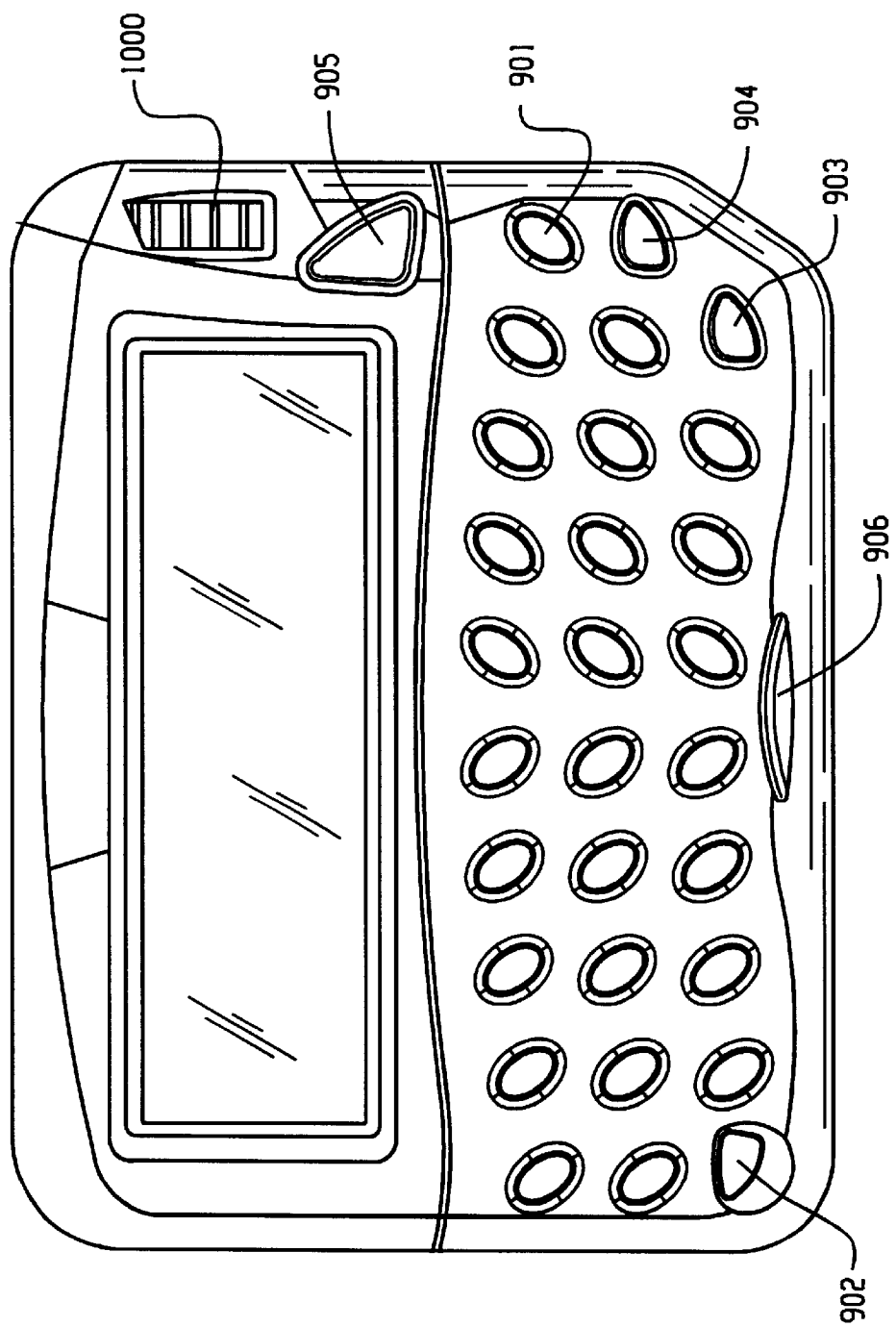
FIG. 2 is a frontal view of the hand-held device showing the shape and placement of the keys on the keyboard and the auxiliary input device.

FIG. 2 is a front view of messaging device 10 that incorporates the invention. Shown in FIG. 2 are a plurality of letter keys 901, and specialized keys 902, 903, 904 and 905 and space bar 906. Also shown is thumbwheel 1000 in its vertical orientation and in association with display 500 and keyboard 900. In the preferred embodiment, 902 is the alt key, 903 is the cap key, 904 is the line feed key and 905 is the backspace key.

FIG. 2 also shows the arrangement of keys 901 on the keyboard into multiple rows. Each of the rows of keys 901 preferably defines an arc along which the keys 901 are positioned. Such an arrangement of the keys 901 not only facilitates thumb typing but also reduces the space occupied by the keyboard. The arced rows of keys 901 shown in FIG.

2 allow for location of the space bar 906 in its conventional keyboard position but reduce the amount of unoccupied space at the ends of the space bar 906.

Figure 3:
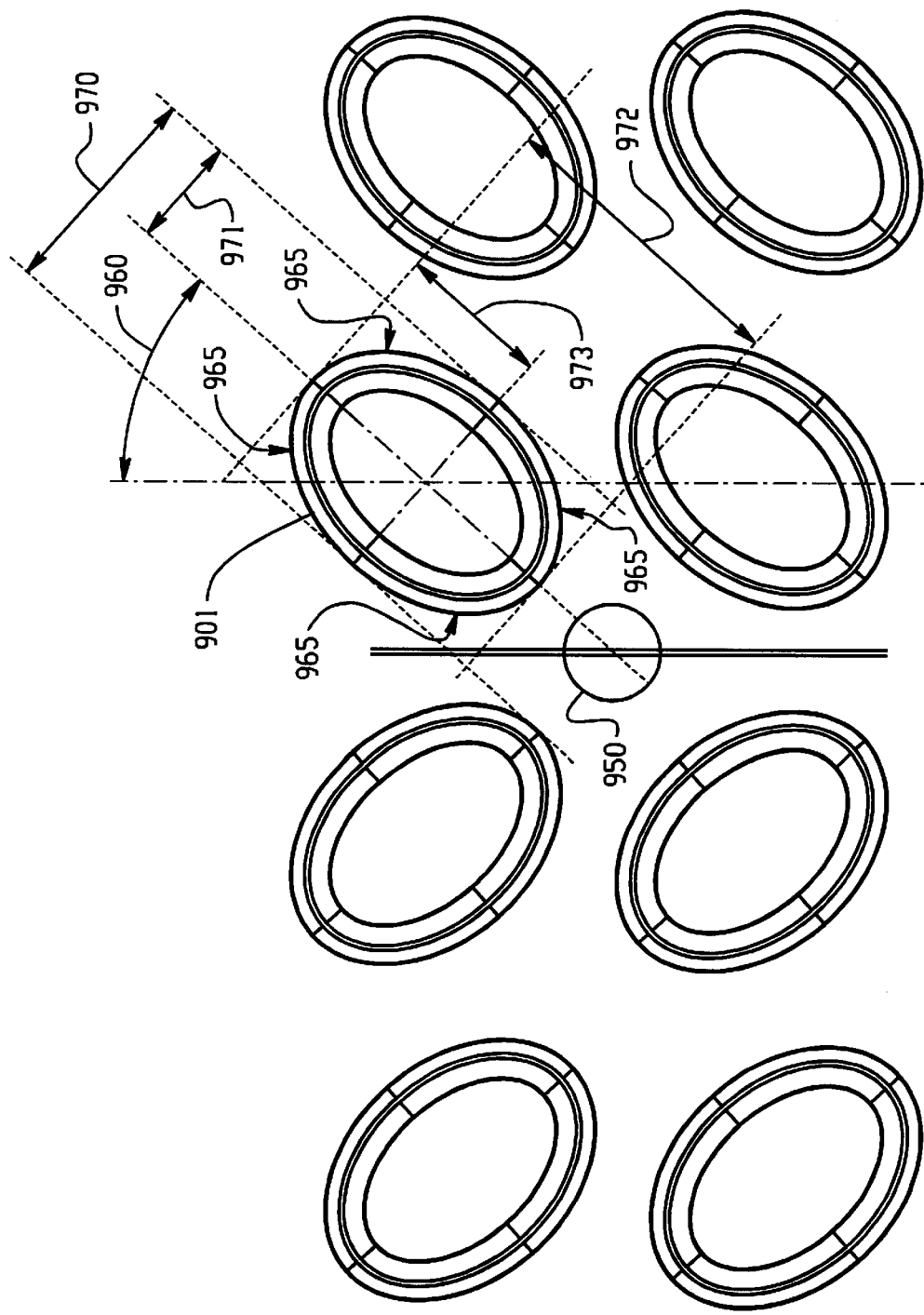
FIG. 3 is a diagram of showing the shape, size and placement of the keys on the keyboard.

FIG. 3 is a view of a subset of the letter keys 901, showing the dimensions and relative position of the keys. Shown also is the point 950 that marks the center of keyboard 900, key dimensions 970, 971, 972 and 973, as well as angle 960 and the rho value 965, representing curvature of a letter key 901. In investigating optimal key placement on the keyboard, it was determined that the keys should be placed at an angle 960 relative to vertical that facilitated easy typing using thumbs. That angle is preferably positive 40 degrees relative to vertical for keys on the right side of the keyboard (where 950 is the center of the keyboard) and negative 40 degrees for the keys on the left side of the keyboard, although complementary angles ranging from 20 degrees to 70 degrees could also be used to accomplish the goal, albeit less optimally, of facilitating thumb typing. Also as shown on FIGS. 2 and 3, the keys are dispersed across keyboard 900 evenly so that there is sufficient space between the keys to decrease the opportunity for multiple keys being depressed while thumb typing. Additionally, the keys are sized appropriately given the footprint of the messaging device and the keyboard 900. In its preferred embodiment, the messaging device 10 measures across its face 64 mm by 89 mm, which does not leave much room for keyboard 900 and display 500. In the preferred embodiment, keyboard 900 occupies over half of the face of the messaging device 10.

The key shape and dimensions are also key components of the invention. In order to maximize the surface area of the key that a thumb would hit, the keys are preferably oval, and have a rho 965 defining the curvature of the key of 0.414, although values may range higher or lower. Other rho values will lead to an acceptable, but not as optimal or aesthetically pleasing shape of keys 901. As to the key dimensions, the width 970 of the key 901 is 4.8 millimeters (971 representing the radius of half that value, 2.4 mm) and the length (or height) 972 of the key 901 is 7 millimeters (973 representing the radius of half that value, 3.5 mm).

Turning to one of the software features that aids in the device 10 being optimally used for thumb typing is a capitalization feature implemented via software. If a user depresses a key 901, the operating system detects a key down event. If the key is released after a period of time, the operating system detects a key up event. If upon a key down event, a period of time elapses before a key up event is detected, the operating system determines that a key repeat event has occurred representing a situation where a user has continued to depress a key without releasing it. A key repeat event is then treated by application software residing in either FLASH 600 or RAM 700 as an event that requires the capitalization of the key previously depressed. This feature disables a key repeat feature and substitutes instead a capitalization feature based upon a key repeat. The timing of the key scanning to determine whether a key has been released can be set to permit a slower keyboard response or a faster keyboard response, depending upon user experience or preferences. Although the capitalization function preferably works only to change the state of a letter to a capital, it alternatively could operate to change a capital letter to a lower case letter. The actual display is changed by the application program substituting the value of the capital letter in the register that holds the value of the letter to be displayed. As alternatively implemented, the continued depressing without release of a letter key could result in a key oscillating between upper case and lower case, depending on the length of time the key is depressed.

Figure 4:
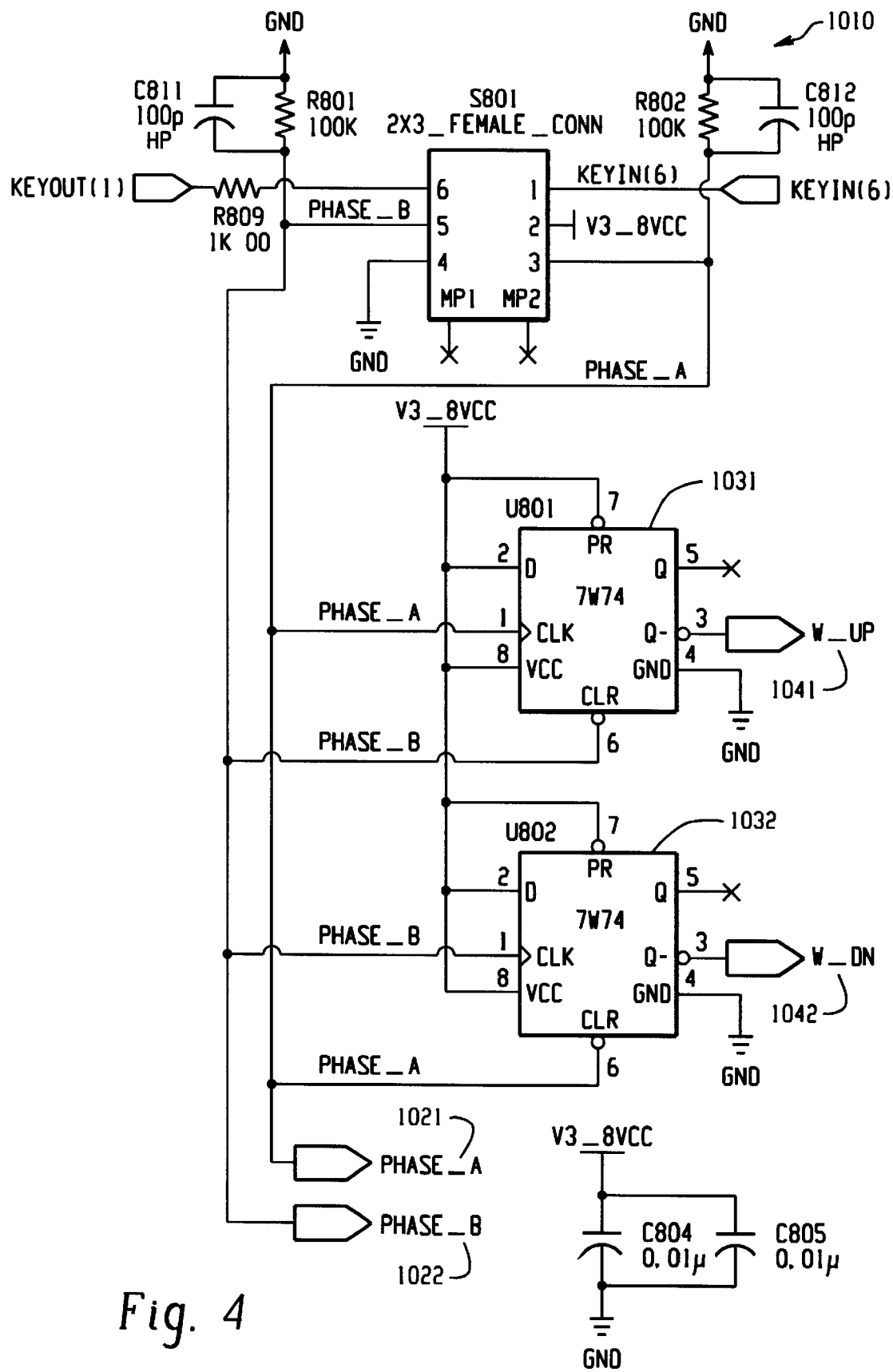
FIG. 4 is a diagram of the control circuitry for the thumbwheel.

FIG. 4 is the logic circuitry 1010 associated with thumbwheel 1000. Thumbwheel 1000 outputs quadrature signals phase A 1021 and phase B 1022, which are processed by D flip-flops 1031 and 1032 to present signals 1041 W_UP and 1042 W_DN to microprocessor 300. Signals 1041 and 1042 represent, respectively, a user rolling the thumbwheel up and rolling the thumbwheel down.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed is:

1. A handheld device optimally configured for use with the thumbs of user, comprising:

tilted at a positive angle relative to a common vertical reference through the device, and each oblong shaped key in the second set of oblong shaped keys is titled at a negative angle relative to the common vertical reference through the device;

an auxiliary input device positioned in relative proximity to the keyboard;

a display positioned adjacent to the keyboard; and software residing in the device for providing functionality to inputs received from the auxiliary input device and the keyboard.

2. The device as claimed in claim 1, wherein the first and second set of oblong shaped keys are oval shaped.

3. The device as claimed in claim 1, wherein the positive angle is about 40 degrees and the negative angle is about 40 degrees.

4. The device as claimed in claim 3, wherein a rho value defining the curvature of the first and second set of oblong shaped keys is about 0.414.

5. The device as claimed in claim 4, wherein the auxiliary input device is a thumbwheel.

6. The device as claimed in claim 3, wherein the thumbwheel is vertically oriented.

7. The device as claimed in claim 4, wherein the device is a two-way pager.

8. The device as claimed in claim 5, wherein the device is an integrated email device.

9. The device as claimed in claim 6, wherein the device is a personal digital assistant.

10. The device of claim 1, wherein the first and second sets of oblong shaped keys are positioned on the device along an arc.

11. The device of claim 1, wherein the first set of oblong shaped keys and the second set of oblong shaped keys comprise a first row of keys.

12. The device of claim 11, further comprising a second row of oblong shaped keys positioned on the device beneath the first row of oblong shaped keys.

13. The device of claim 12, wherein the first and second rows of oblong shaped keys are positioned on the device along respective first and second arcs.

14. The device of claim 13, wherein the first and second arcs are concentric.

15. A handheld device optimally configured for use with the thumbs of a user comprising:

(a) a device housing; and (b) a keyboard residing on the housing, the keyboard having a first set of oblong shaped keys and a second set of oblong shaped keys, wherein each oblong shaped key in the first set of oblong shaped keys is tilted at a positive angle relative to a vertical reference and each oblong shaped key in the second set of oblong shaped keys is tilted at a negative angle relative to the vertical reference.

16. The handheld device of claim 15, wherein the first and second set of oblong shaped keys are oval shaped.

17. The handheld device of claim 16, wherein a rho value defining the curvature of the oblong shaped keys is about 0.4.

18. The handheld device 15, wherein the positive angle is about 40 degrees and the negative angle is about 40 degrees.

19. The handheld device of claim 15, wherein the first and second sets of oblong shaped keys are positioned on the device along the arc.

20. The handheld device of claim 15, wherein the first set of oblong shaped keys and the second set of oblong shaped keys comprise a first row of keys.

21. The handheld device of claim 20, further comprising a second row of oblong shaped keys positioned on the device beneath the first row of oblong shaped keys.

22. The handheld device of claim 21, wherein the first and second rows of oblong shaped keys are positioned on the device along respective first and second arcs.

23. The handheld device of claim 15, wherein the first and second sets of oblong shaped keys form a QWERTY keyboard.

24. The handheld device of claim 15, wherein the handheld device is a two-pager, a cellular telephone, a portable digital assistant, or an electronic organizer.

25. A keyboard for use with a handheld electronic device, comprising:
    a first set of oblong shaped keys and a set of oblong shaped keys, wherein each key in the first set of oblong shaped keys is tilted at a positive angle relative to a vertical reference and each oblong shaped key in the second set of oblong shaped keys is titled at a negative angle relative to the vertical reference.

26. The keyboard of claim 25, wherein the first and second set of oblong shaped keys are oval shaped.

27. The keyboard of claim 26, wherein a rho value defining the curvature of the oblong shaped keys is about 0.4.

28. The keyboard of claim 25, wherein the positive angle is about 40 degrees and the negative angle is about 40 degrees.

29. The keyboard of claim 25, wherein the first and second sets of oblong shaped keys are positioned on the device along the arc.

30. The keyboard of claim 25, wherein the first set of oblong shaped keys and the second set of oblong shaped keys comprise a first row of keys.

31. The keyboard of claim 30, further comprising a second row of oblong shaped keys positioned on the device beneath the first row of oblong shaped keys.

32. The keyboard of claim 31, wherein the first and second rows of oblong shaped keys are positioned on the device along respective first and second arcs.

33. The keyboard of claim 25, wherein the first and second sets of oblong shaped keys form a QWERTY keyboard.

34. The keyboard of claim 25, wherein the first and second sets of oblong shaped keys form a DVORAK keyboard.

35. The keyboard of claim 25, wherein the positive and negative angles are in the range of about 20 to 70 degrees from the vertical reference.

36. The keyboard of claim 25, wherein the keys in the first and second sets of keys are separated from each other by a common spacing.

37. The keyboard of claim 25, wherein the keys in the first and second sets of keys are about 5 millimeters in width and 7 millimeters in length.

38. A QWERTY keyboard for use with a handheld electronic device, comprising:
    a first set of oblong shaped keys and a second set of oblong shaped keys, wherein each key in the first set of keys is tilted at a positive angle relative to a vertical reference and each key in the second set of keys is tilted at a negative angle relative to the vertical reference,
    wherein the first and second set of keys form a QWERTY keyboard.

39. An electronic communication device, comprising:
    a transceiver for transmitting and receiving text messages;
    a keyboard for composing text messages to be transmitted by the transceiver, wherein the keyboard includes a first set of oblong shaped keys and a second set of oblong shaped keys, wherein each key in the first set of keys is tilted at a positive angle relative to a vertical reference and each key in the second set of keys is tilted at a negative angle relative to the vertical reference; and
    a display for displaying the received text messages.

40. The electronic communication device of claim 39, wherein the first and second sets of keys are oval shaped keys.

41. The electronic communication device of claim 39, further comprising:
    an auxiliary input device for selecting an operation to be performed by the device, wherein a menu of operations is presented on the display.

42. The electronic communication device of claim 39, wherein the text messages are e-mail messages.

43. The electronic communication device of claim 39, wherein the transceiver includes:
    a first antenna for receiving a text message; and
    a second antenna for transmitting a text message.

44. The electronic communication device of claim 43, wherein the transceiver further includes:
    a receiver, coupled to the first antenna, for demodulating the received text message; and
    a transmitter coupled to the second antenna, for generating a modulated text message.

45. The electronic communication device of claim 44, wherein the transceiver further includes:
    a digital signal processor coupled to the transmitter and the receiver for processing demodulated text messages from the receiver, and for providing modulation information to the transmitter.

46. A keyboard for use with a handheld electronic device, comprising:
    a first set of oblong shaped keys and a second set of oblong shaped keys, wherein the keys in the first set of keys are tilted at a first angle relative to a vertical reference and the keys in the second set of keys are tilted at a second angle relative to the vertical reference,
    wherein the first and second set of keys form a QWERTY keyboard.

47. The keyboard of claim 46, wherein the oblong shaped keys are oval shaped.

48. The keyboard of claim 46, wherein the handheld electronic device is a cellular telephone, a two-way pager, a personal digital assistant, or an electronic organizer.

* * * * *

UNITED STATES PATENT AND TRADEMARK OFFICE
CERTIFICATE OF CORRECTION

PATENT NO.    : 6,278,442 B1
DATED         : August 21, 2001
INVENTOR(S)   : Griffin et al.

It is certified that error appears in the above-identified patent and that said Letters Patent is hereby corrected as shown below:

Column 6,
Line 17, after "of" insert -- a --.
Line 18, before "tilted" insert -- a keyboard having a first set of oblong shaped keys and a second set of oblong shaped keys, wherein each oblong shaped key in the first set of oblong shaped keys is --.

Column 7,
Line 29, before "pager" insert -- way --.
Line 33, insert -- second -- before "set" at the second occurrence of set.

Column 8,
Line 44, after "transmitter" insert -- , --.

Signed and Sealed this

Eighteenth Day of June, 2002

Attest:

JAMES E. ROGAN
Attesting Officer    Director of the United States Patent and Trademark Office